United States Patent Office 3,291,826
Patented Dec. 13, 1966

3,291,826
TETRAKIS-(1,1-DIHYDROPERFLUORO-OCTYL)
UREA, INTERMEDIATE AND PROCESS
Theodore Mill, Palo Alto, and John O. Rodin and Robert
M. Silverstein, Menlo Park, Calif., and Cyril Woolf,
Morristown, N.J., assignors to Allied Chemical Corporation, New York, N.Y., a corporation of New York
No Drawing. Filed Mar. 24, 1964, Ser. No. 354,449
8 Claims. (Cl. 260—544)

This invention relates to the new and novel tetrakis-(1,1-dihydroperfluoro-octyl) urea and to a process for its preparation.

Tetrakis-(1,1-dihydroperfluoro-octyl) urea, a white crystalline solid having a melting point of about 91–92° C., is useful as a high temperature lubricant and heat transfer medium. The new compound is characterized by the formula:

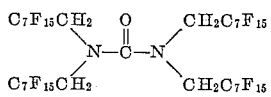
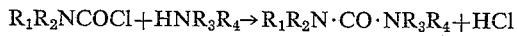

It is known to produce substituted ureas from N-substituted carbamyl chlorides by reacting them with amines. A representative reaction may be illustrated by the following equation:

$$R_1R_2NCOCl + HNR_3R_4 \rightarrow R_1R_2N \cdot CO \cdot NR_3R_4 + HCl$$

wherein the R's may be the same or different and may be hydrogen or a hydrocarbon radical.

We have made the surprising discovery that bis-(1,1-dihydroperfluoro-octyl) carbamyl chloride may be converted to tetrakis-(1,1-dihydroperfluoro-octyl) urea when heated in the presence of dimethylformamide. As far as we are aware, the preparation of ureas by treatment of substituted carbamyl chlorides with dimethylformamide has not been known until the present invention. We do not fully understand the mechanism of the reaction which takes place and in an effort to explain the behavior of the reaction, we investigated the possibility that the catalyzed hydrolysis of carbamic acid occurs followed by decarboxylation to the amine and then catalyzed reaction of the amine with unchanged carbamyl chloride. This possibility was negated, however, upon our discovery that the reaction which takes place is independent of the presence of water. Other theories were investigated such as those involving participation of dimethylformamide to form the intermediate amine-immonium ion $$(R_fCH_2)_2N \cdot CH = N^+(CH_3)_2Cl^-$$

Such mechanisms, however, were proven purely speculative and could not satisfactorily account for the unexpected practical finding which comprises the essence of the present invention. Whatever the theory or phenomenon involved, we found that tetrakis-(1,1-dihydroperfluoro-octyl) urea was produced in the reaction medium by heating bis-(1,1-dihydroperfluoro-octyl) carbamyl chloride in the presence of dimethylformamide. The reaction which takes place may be illustrated by the following equation:

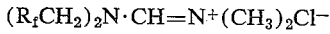
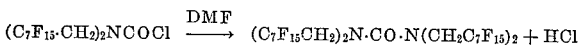

The starting material bis-(1,1-dihydroperfluoro-octyl) carbamyl chloride, also a new compound, with a boiling point of about 138–141°/12–13 mm. Hg may be conveniently prepared by a series of sequential steps as hereinafter described. First, commercially available perfluorooctanoic acid is converted to the acid chloride by treatment with benzotrichloride or thionyl chloride. Generally, the treatment involves refluxing the admixture until cessation of hydrogen chloride evolution which is an indication that the reaction is complete. The mixture is then distilled and the product, perfluorooctanoyl chloride, a water white liquid, boiling at about 133° C., is collected.

The perfluorooctanoyl chloride is thereafter introduced into a suitable apparatus equipped with agitating means, gas inlet and outlet tubes, and a water condenser, and dry ammonia, either in liquid or gaseous form is introduced into the reaction zone until ammonia no longer is absorbed which is usually in about 1½–3 hours. Ammonium chloride is precipitated as a by-product and may be separated from the reaction mixture by conventional means such as by filtration or centrifuge. The remaining solution containing perfluorooctanoamide is then washed with a solvent to remove impurities.

The reactions described above may be illustrated by the following equations:

(1)  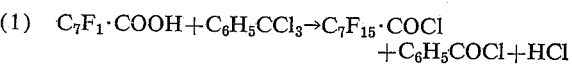
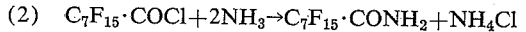

(2)  $C_7F_{15} \cdot COCl + 2NH_3 \rightarrow C_7F_{15} \cdot CONH_2 + NH_4Cl$

The perfluorooctanoamide produced according to Equation 2 above is thereafter converted to 1,1-dihydroperfluorooctylamine by employment of a reducing agent, examples of which include lithium aluminum hydride or sodium borohydride in the presence of aluminum chloride or $BF_3$ etherate, or alternatively the reduction is effected by catalytic pressure hydrogenation over a catalyst, for example, a copper chromite catalyst. In a representative technique, the reducing agent is added to a reaction vessel containing an inert solvent and an inert gas is passed throughout the system both before the addition of the reducing agent and during the reaction period. Thereafter, a solution of perfluorooctanoylamide as prepared from Equation 2 is added to the mixture and the mixture refluxed, to produce 1,1-dihydroperfluorooctylamine in the reaction medium. The 1,1-dihydroperfluorooctylamine, a water white liquid with a boiling point of about 150–152° C., may be recovered from the reaction medium by conventional means such as by distillation. The above reaction may be illustrated by the following equation:

(3)  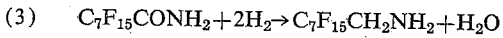

The 1,1-dihydroperfluorooctylamine produced according to the above procedure is thereafter reacted with perfluorooctanoyl chloride to form N-1,1-dihydroperfluorooctyl perfluorooctanamide. Conventional apparatus which includes agitating and cooling means may be employed according to the procedure. The reaction is slightly exothermic and is preferably conducted over an extended period of time generally about 0.5 to 8 hours accompanied by sufficient cooling to maintain the temperature within the range of about 10° C. to 70° C. preferably 30 to 40° C. The product, N-1,1-dihydroperfluorooctyl perfluorooctanoamide, a pink colored solid, may be recovered from the reaction medium by filtration or centrifuge. The N-1,1-dihydroperfluorooctyl perfluorooctanamide is thereafter reduced to the secondary amine, bis-(1,1-dihydroperfluorooctyl) amine by the use of a suitable reducing agent according to a procedure similar to that employed for the conversion of perfluorooctanamide to 1,1-dihydroperfluorooctylamine. The above reactions may be illustrated by the following equations:

(4)  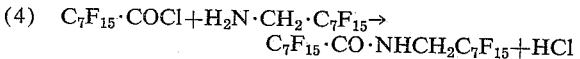

(5)  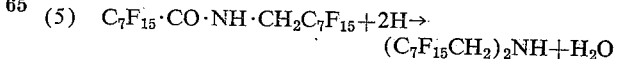

Finally, the bis-(1,1-dihydroperfluoro-octyl) carbamyl chloride is prepared by reacting the secondary amine from above with phosgene, in a bomb at elevated temperatures, that is, temperatures of about 120–150° C. The product, bis-(1,1-dihydroperfluoro-octyl) carbamyl chloride, is a liquid, almost water white, and has a boiling point of about 138–141° C./12–13 mm. of Hg.

The dimethylformamide used in the present invention is a commercially readily available compound. The amount of dimethylformamide employed is dictated by economic and utilitarian factors, however, relatively small amounts of dimethylformamide may be successfully employed according to the invention. In general, between about 5 to 15 parts by weight of dimethylformamide for about 9 to 11 parts by weight of the bis-(1,1-dihydroperfluoro-octyl) carbamyl chloride is preferred, however, larger amounts of dimethylformamide as high as 10 parts of dimethylformamide per part by weight of N-bis-(dihydroperfluoro-octyl) carbamyl chloride can be employed in the present invention, although no added advantages are obtained. The presence of small amounts of water is permissible although not essential for successful practice of the invention.

Temperatures employed for transformation of bis-(1,1-dihydroperfluoro-octyl) carbamyl chloride to tetrakis-(1,1-dihydroperfluoro-octyl) urea may be varied over a wide range such as about from 0° to 150° C. Near the lower range, however, i.e., about 25° C., the transformation proceeds at a very slow rate. Temperatures in the range of about 75–100° C., are preferred. Merely as illustrative when the temperature is maintained in the range of about 80–95° C., the reaction is generally completed in about 8 to 24 hours.

The reaction may be conveniently carried out at atmospheric pressure, however, the use of sub-atmospheric or super-atmospheric pressure may be employed if desired.

The crude product is produced in the reaction medium as a solid and may be recovered by any of the procedures known in the art for the recovery of a solid. For example, the product may be recovered from the reaction medium by decantation, or by dissolving the solid in a solvent such as ether followed by aqueous acid washing, drying and crystallization. Other obvious variations known in the art may be used for recovery of the solid such as by vacuum sublimation.

The following Examples 1 through 5 illustrate the sequential steps for producing the starting material N-bis-(dihydroperfluoro-octyl) carbamyl chloride. Example 6 illustrates preparation of tetrakis-(1,1-dihydroperfluoro-octyl) urea.

EXAMPLE 1

*Preparation of perfluorooctanoyl chloride*

402.5 g. (0.97 mol) of perfluorooctanoic acid and 276 g. (200 ml.) or benzotrichloride were admixed in a 1000 ml. round bottom flask. The mixture was refluxed until no more hydrogen chloride was liberated (about 100 minutes). The mixture was then distilled and 406.3 g. of the product perfluorooctanoyl chloride, a water white liquid boiling at 133–134° was collected. The conversion of perfluorooctanoic acid to perfluorooctanoyl chloride was about 96.6% and was calculated as follows:

$$\text{Percent conversion} = \frac{\text{mols of } CF_3(CF_2)_6\overset{O}{\underset{\|}{C}}Cl \text{ obtained}}{\text{mols of } CF_3(CF_2)_6\overset{O}{\underset{\|}{C}}OH \text{ put in}}$$

EXAMPLE 2

*Preparation of 1,1-dihydroperfluorooctyl amine*

Into a 100 ml., 3-neck flask, equipped with a magnetic stirring bar, a gas inlet tube, a water condenser with a gas outlet tube and a stopper, was placed a solution of 211 g. (0.49 mol) of perfluorooctanoyl chloride in 500 ml. of tetrahydrofuran. Gaseous ammonia was passed in for 120 minutes until no more ammonium was absorbed. The solution turned cloudy due to precipitation of ammonium chloride. The mixture was then filtered and the residue washed with tetrahydrofuran. There was obtained 26.5 g. (0.50 mol) of ammonium chloride on the filter paper. Total volume of filtrate, which is a tetrahydrofuran solution of perfluorooctanamide, was 750 ml. To a 2-liter, 1-neck flask, containing 600 ml. of dry ethyl ether and equipped with a Y-adapter to which was attached an adding funnel and a condenser were added 20 g. (0.54 mol) of lithium aluminum hydride. Nitrogen was passed throughout the system both before lithium aluminum hydride was added and during the reaction period. Within about 45 minutes, 350 ml. of aliquot of a solution of perfluorooctanamide in tetrahydrofuran, prepared above, were added. The mixture was refluxed overnight for about 20 hours. The suspension was cooled in an ice-methanol bath and 122 ml. of dry ethyl acetate was added to decompose the excess lithium aluminum hydride. After one hour of continued stirring, 70 ml. of cooled 15% sodium hydroxide solution was added followed by 25 ml. of water.

The mixture was filtered and the insoluble material was washed well with ethyl ether. The filtrate was transferred to a 2-liter flask and distilled and the fraction boiling between 34–35° C., and 55–81° C., were collected. At this point, aqueous alkali was added and distillation continued. At 95° C., the desired product was steam distilled. Distillation stopped after the temperature rose to 100° C. This fraction was then placed in a separatory funnel and the lower amine layer was separated. The aqueous layer was then extracted twice with ethyl ether and the ether extracts were combined with the amine layer and dried overnight with anhydrous sodium sulfate. The ether solution was filtered and filtrate transferred to a 100 ml. flask and distilled. After removal of ethyl ether, the fraction boiling between 150–152° C., was collected (58.0 g. of a water white liquid) and was later identified as 1,1-dihydroperfluorooctylamine per a conversion of perfluorooctanoyl chloride to 1,1-dihydroperfluorooctyl amine of 59.6% calculated as follows:

$$\text{Percent conversion} = \frac{\text{mols of } CF_3(CF_2)_6CH_2NH_2 \text{ obtained}}{\text{mols of } CF_3(CF_2)_6\overset{O}{\underset{\|}{C}}Cl \text{ put in}} \times 100$$

EXAMPLE 3

*Preparation of N-1,1-dihydroperfluorooctyl-perfluorooctanamide*

108 ml. of pyridine was placed into a 1-liter, 3-neck flask equipped with a stirrer, condenser, and addition funnel and 121.1 g. (0.29 mol) of perfluorooctanoyl chloride was added with stirring and cooling. 106.7 g. (0.27 mol) of 1,1-dihydroperfluorooctylamine was then added slowly over a ½ hour period with stirring and cooling. After stirring the reaction mixture at 35–40° for an additional one hour period, 433 ml. of water was added slowly before the suspension was cooled and filtered. The solid was filtered and washed well with cold water, then air dried, and finally dried in a vacuum desiccator. There was obtained 209.4 g. of a pink colored product. The conversion of 1,1-dihydroperfluorooctyl amine to N-1,1-dihydroperfluorooctyl perfluorooctanamide was 88.1%. The conversion was calculated as follows:

Percent conversion =

$$\frac{\text{mols of N-1,1-dihydroperfluorooctyl perfluorooctanamide obtained}}{\text{mols of N-1,1-dihydroperfluorooctyl amine put in}} \times 100$$

EXAMPLE 4

*Preparation of bis-(1,1-dihydroperfluorooctyl) amine*

189.2 g. (0.24 mols) of N-(1,1-dihydroperfluorooctyl) perfluorooctanamide was dissolved in 600 ml. of hot tetrahydrofuran and added to 1408 g. (0.39 mol) of lithium aluminum hydride in 288 ml. of tetrahydrofuran over a 25-minute period. The mixture was stirred and heated at reflux for 42 hours. After cooling the reaction mixture with an ice-methanol bath, 140 ml. of ethyl acetate was added with stirring to decompose excess lithium aluminum hydride. 81 ml. of 15% sodium hydroxide solution was then added, followed by 115 ml. of water. The solid was filtered off and washed first with tetrahydrofuran and then followed by ether. The solvents from the filtrate were removed by evaporation under reduced pressure, using a rotary evaporator. A brown oil remained behind. The oil was taken up in ether and the ether dried over anhydrous sodium sulfate overnight. Dry hydrogen chloride was passed into the ether solution for two hours and then the formed solid amine hydrochloride was filtered and air-dried. The weight of amine hydrochloride obtained was 207 g. The solid amine hydrochloride was suspended in approximately 1 l. of 25% sodium hydroxide solution. The released amine was extracted with ether. The ether extracts were washed with water and then dried over anhydrous sodium sulfate. The ether was removed by evaporation at reduced pressure (rotary evaporator) leaving a brown oil. Weight of this brown oil was 155.2 g. The conversion of N-1,1-dihydroperfluorooctyl perfluorooctanamide to bis-1,1-dihydroperfluorooctylamine was 82.8%. The conversion was calculated as follows:

Percent conversion=

$$\frac{\text{mols of bis-1,1-dihydroperfluorooctyl amine obtained}}{\text{mols of N-1,1-dihydroperfluorooctyl- perfluorooctanamide put in}} \times 100$$

EXAMPLE 5

*Preparation of bis-(1,1-dihydroperfluorooctyl) carbamyl chloride*

222 g. (0.28 mol) of bis-1,1-dihydroperfluorooctylamine was placed in a 300 ml. stainless steel bomb. The bomb was flushed with nitrogen and then evacuated. 100 g. (1.0 mol) of phosgene were introduced while the bomb was cooled in a Dry Ice-acetone bath. The bomb was then shaken at 125° for 15 hours and at 140° for 3 hours. After allowing the bomb to cool to room temperature (approximately 22°), the excess phosgene was then vented. The contents were dissolved in ether and then washed four times with 0.1 N hydrochloric acid solution, followed by three washings with water. The ether solution was then dried over anhydrous sodium sulfate. The sodium sulfate was filtered off and the ether evaporated off by means of a rotary evaporator. There was obtained 235.7 g. of a dark oil. The conversion of bis-(1,1-dihydroperfluoro-octyl)-amine to bis-(1,1 - dihydroperfluoro-octyl) carbamyl chloride was 98.4% of crude product. Redistillation of crude product gave a liquid which was almost water white. B.P.=138–141°/12–13 mm. Hg. The conversion was calculated as follows:

$$\text{Percent conversion} = \frac{\text{mols of } (CF_3(CF_2)_6CH_2)_2\overset{O}{\overset{\|}{N}}CCl \text{ obtained}}{\text{mols of } (CF_3(CF_2)_6CH_2)_2NH \text{ put in}} \times 100$$

EXAMPLE 6

*Tetrakis-(1,1-dihydroperfluoro-octyl) urea*

A suspension of 3.16 g. (0.037 mol) of bis-(dihydroperfluoro-octyl) carbamyl chloride and 2 ml. of dimethylformamide (stored over calcium hydride) was stirred at 95° for 16 hours. The suspension was cooled to 0° and the dimethylformamide was removed by decantation. The product was washed with benzene and dissolved in 250 ml. of ether. The ether solution was washed with 6 N hydrochloric acid, then with water, dried over sodium sulfate, concentrated to a volume of 10 ml., cooled to 0°, and filtered. The white crystalline urea was washed with chloroform and dried. Wt.=1.5 g. (40% yield); M.P. 87–90°. A sample was recrystallized twice from ether; M.P. 91–92°;

$$\lambda_{max}^{Nujol}\ 5.92\mu$$

*Analysis.*—Calcd. for $C_{33}H_8N_2OF_{60}$ (1588): C, 24.9; H, 0.50; F, 71.8. Found: C, 25.2; H, 0.62; F, 71.1.

To determine the effectiveness of tetrakis-(1,1-dihydroperfluoro-octyl) urea as a high temperature lubricant and heat transfer medium, the urea was heated to about 300° C. for about 30 hours with negligible (less than 5%) decomposition showing its stability and hence, utility as heat transfer agent.

Although certain preferred embodiments of the invention have been disclosed for purposes of illustration, it will be evident that various changes and modifications may be made therein without departing from the scope and spirit of the invention.

We claim:
1. Tetrakis-(1,1-dihydroperfluoro-octyl) urea.
2. The process for the preparation of tetrakis-(1,1-dihydroperfluoro-octyl) urea which comprises heating bis-(1,1-dihydroperfluoro-octyl) carbamyl chloride in the presence of dimethylformamide.
3. The process of claim 2 wherein the dimethylformamide is employed in an amount of about (10 parts) by weight of dimethylformamide to about 1 part by weight of bis-(1,1,-dihydroperfluoro-octyl) carbamyl chloride.
4. A process for the preparation of tetrakis-(1,1-dihydroperfluoro-octyl) urea which comprises heating about 10 parts by weight of bis-(1,1-dihydroperfluoro-octyl) carbamyl chloride in the presence of about 5 to 15 parts by weight of dimethylformamide at a temperature within the range of about 75 to 100° C. to convert the bis-(1,1-hydroperfluoro-octyl) carbamyl chloride to tetrakis-(1,1-dihydroperfluoro-octyl) urea.
5. Bis-(1,1-dihydroperfluoro-octyl) carbamyl chloride.
6. The process for the preparation of bis-(1,1-dihydroperfluoro-octyl) carbamyl chloride comprising the steps of (1) reacting in admixture perfluorooctanoic acid and benzotrichloride to convert said perfluorooctanoic acid to perfluorooctanoyl chloride, (2) reacting said perfluorooctanoyl chloride with ammonia to form perfluorooctanamide, (3) treating said perfluorooctanamide with a reducing agent to convert said perfluorooctanamide to 1,1-dihydroperfluorooctylamine, (4) reacting in admixture said 1,1-dihydrofluorooctylamine with perfluorooctanoyl chloride to form N-1,1-dihydroperfluorooctyl perfluorooctanamide, (5) treating said N-1,1-dihydroperfluorooctyl perfluorooctanamide with a reducing agent to convert said N-1,1-dihydroperfluorooctyl perfluorooctanamide to bis-1,1-dihydroperfluorooctyl amine, (6) reacting said bis-1,1-dihydroperfluorooctylamine with phosgene at a temperature in the range of 75 to 250° C. to produce bis-(1,1-dihydroperfluoro-octyl) carbamyl chloride.
7. The process for the preparation of bis-(1,1-dihydroperfluoro-octyl) carbamyl chloride comprising the steps of (1) reacting in admixture perfluorooctanoic acid and thionyl chloride to convert said perfluorooctanoic acid to perfluorooctanoyl chloride, (2) reacting said perfluorooctanoyl chloride with ammonia to form perfluorooctanoylamide, (3) treating said perfluorooctanoylamide with lithium aluminum hydride to convert said perfluorooctanoylamide to 1,1-dihydroperfluorooctylamine, (4) reacting in admixture said 1,1-dihydroperfluorooctylamine with perfluorooctanoyl chloride to form N-1,1-dihydroperfluorooctyl perfluorooctanamide, (5) treating said N-1,1-dihydroperfluorooctyl perfluorooctanamide with lithium aluminum hydride to convert said N-1,1-dihydroperfluorooctyl perfluorooctanamide to bis-1,1-dihydroperfluorooctylamine, (6) reacting said bis-1,1-dihydroperfluorooctylamine with phosgene at a temperature in the range of 75 to 250° C. to produce bis-(1,1-dihydroperfluoro-octyl) carbamyl chloride.
8. The process for the preparation of tetrakis-(1,1-dihydroperfluoro-octyl) urea which comprises (1) reacting in admixture perfluorooctanoic acid and benzotrichloride to convert said perfluorooctanoic acid to perfluorooctanoyl chloride, (2) reacting said perfluorooctanoyl chloride with ammonia to form perfluorooctanamide, (3) treating said perfluorooctanoylamide with a reducing agent to convert said perfluorooctanoylamide to 1,1-dihydroperfluorooctylamine, (4) reacting in admixture said 1,1-dihydroperfluorooctylamine with perfluorooctanoyl chloride to form N-1,1-dihydrofluorooctyl perfluorooctanamide, (5) treating said N-1,1-dihydroperfluorooctyl perfluorooctanamide with a reducing agent to convert said N-1,1,-dihydroperfluorooctyl perfluorooctanamide to bis-1,1-dihydroperfluorooctyl amine, (6) reacting said bis-1,1-dihydroperfluorooctyl amine with phosgene at a temperature in the range of 75 to 250° C. to produce bis-(1,1-dihydroperfluoro-octyl) carbamyl chloride, and (7) heating said bis-(1,1-dihydroperfluoro-octyl) carbamyl chloride in the presence of dimethyl formamide to produce tetrakis-(1,1)-dihydroperfluoro-octyl) urea.

References Cited by the Examiner

UNITED STATES PATENTS

| | | | |
|---|---|---|---|
| 2,272,293 | 2/1942 | Dreyfus | 260—547 |
| 2,278,537 | 4/1962 | Dreyfus et al. | 260—547 |
| 3,000,938 | 9/1961 | Close | 260—553 |
| 3,000,939 | 9/1961 | Frankel | 260—553 |

ALEX MAZEL, *Primary Examiner.*

NICHOLAS S. RIZZO, *Examiner.*

HENRY R. JILES, *Assistant Examiner.*